US011093087B2

(12) United States Patent
Harris et al.

(10) Patent No.: US 11,093,087 B2
(45) Date of Patent: Aug. 17, 2021

(54) GLASS SUBSTRATES WITH TOUCHSCREEN TECHNOLOGY

(71) Applicant: DIRTT ENVIRONMENTAL SOLUTIONS LTD., Calgary (CA)

(72) Inventors: Patrick J Harris, Calgary (CA); Rastislav Seffer, Okotoks (CA)

(73) Assignee: DIRTT ENVIRONMENTAL SOLUTIONS LTD., Calgary (CA)

(*) Notice: Subject to any disclaimer, the term of this patent is extended or adjusted under 35 U.S.C. 154(b) by 736 days.

(21) Appl. No.: 15/741,489

(22) PCT Filed: Jun. 1, 2017

(86) PCT No.: PCT/US2017/035520
§ 371 (c)(1),
(2) Date: Jan. 2, 2018

(87) PCT Pub. No.: WO2017/213960
PCT Pub. Date: Dec. 14, 2017

(65) Prior Publication Data
US 2018/0195290 A1 Jul. 12, 2018

Related U.S. Application Data

(60) Provisional application No. 62/348,718, filed on Jun. 10, 2016.

(51) Int. Cl.
*G06F 3/044* (2006.01)
*E04F 13/08* (2006.01)
(Continued)

(52) U.S. Cl.
CPC ............ *G06F 3/044* (2013.01); *E04B 2/7433* (2013.01); *E04F 13/074* (2013.01); *E04F 13/08* (2013.01);
(Continued)

(58) Field of Classification Search
None
See application file for complete search history.

(56) References Cited

U.S. PATENT DOCUMENTS 2,042,290 A 5/1936 Barrett
2,658,810 A 11/1953 Howard et al.
(Continued)

FOREIGN PATENT DOCUMENTS

CA 248428 A 3/1925
CA 055086 S 10/1985
(Continued)

OTHER PUBLICATIONS

Office Action for U.S. Appl. No. 15/741,180, dated May 9, 2019.
(Continued)

*Primary Examiner* — Joshua K Ihezie
(74) *Attorney, Agent, or Firm* — Workman Nydegger

(57) ABSTRACT

Embodiments are generally directed to modular wall systems. Such modular wall systems include a modular frame, one or more tiles attached to the modular frame, a decorative panel positioned between at least one of the tiles and an inter-connected conductive plate, and conductive plates that are configured to hold an electrical potential and detect an electrical capacitance through the decorative panel at an identified position on the conductive plate when touched. In another embodiment, a modular wall system includes a modular frame, tiles attached to the modular frame, conductive plates that have pockets formed therein, and an inductive plate disposed in the pocket of the conductive plate. As such, the inductive plate provides a hidden switching location that, when activated, triggers transmission of a signal to a specified destination.

20 Claims, 10 Drawing Sheets

(51) Int. Cl.
  *E04B 2/74* (2006.01)
  *E04F 13/074* (2006.01)
(52) U.S. Cl.
  CPC .. *E04F 13/0862* (2013.01); *E04B 2002/7461* (2013.01); *E04B 2002/7488* (2013.01); *E04F 2290/02* (2013.01)

(56) References Cited

U.S. PATENT DOCUMENTS

| | | |
|---|---|---|
| 2,676,481 A | 4/1954 | Hoffman |
| 3,037,593 A | 6/1962 | Webster |
| 3,088,127 A | 5/1963 | Charles |
| 3,180,457 A | 4/1965 | Bohnsack |
| 3,251,169 A | 5/1966 | Cornelissen |
| 3,295,283 A | 1/1967 | Griffith et al. |
| 3,371,454 A | 3/1968 | Anderson |
| 3,486,287 A | 12/1969 | Guillon |
| 3,498,405 A | 3/1970 | Charpentier |
| 3,521,937 A | 7/1970 | Buhrmaster et al. |
| 3,602,226 A | 8/1971 | Ericson |
| 3,603,053 A | 9/1971 | Loghem et al. |
| 3,621,635 A | 11/1971 | Lange |
| 3,646,180 A | 2/1972 | Winnick |
| 3,675,382 A | 7/1972 | Lickliter et al. |
| 3,696,569 A | 10/1972 | Didry |
| 3,751,127 A | 8/1973 | Pospisil et al. |
| 3,852,148 A | 12/1974 | Pryor |
| 3,854,269 A | 12/1974 | Hancock |
| 3,866,364 A | 2/1975 | Pollard |
| 3,869,198 A | 3/1975 | Ballentine |
| 3,885,361 A | 5/1975 | De Schutter |
| 4,027,878 A | 6/1977 | Dadbeh |
| 4,031,680 A | 6/1977 | Stoakes |
| 4,052,832 A | 10/1977 | Jungers et al. |
| 4,065,904 A | 1/1978 | Taylor et al. |
| 4,101,231 A | 7/1978 | Streib |
| 4,103,373 A | 8/1978 | Luedtke et al. |
| 4,128,983 A | 12/1978 | Matsubara |
| 4,142,342 A | 3/1979 | Jungers et al. |
| 4,177,101 A | 12/1979 | Evans |
| 4,277,920 A | 7/1981 | Dixon |
| 4,337,997 A | 7/1982 | Sadoune |
| 4,356,672 A | 11/1982 | Beckman et al. |
| 4,438,614 A | 3/1984 | Raith et al. |
| 4,449,337 A | 5/1984 | Gzym et al. |
| 4,493,172 A | 1/1985 | Jones |
| 4,535,577 A | 8/1985 | Tenser et al. |
| 4,544,300 A | 10/1985 | Lew et al. |
| 4,556,598 A | 12/1985 | Bloom |
| 4,600,975 A | 7/1986 | Roberts |
| 4,631,881 A | 12/1986 | Charman |
| 4,648,231 A | 3/1987 | Laroche |
| 4,652,170 A | 3/1987 | Lew |
| 4,663,228 A | 5/1987 | Bolton |
| 4,688,491 A | 8/1987 | Herrera et al. |
| 4,689,262 A | 8/1987 | Bloom |
| 4,752,101 A | 6/1988 | Yurchenco et al. |
| 4,757,657 A | 7/1988 | Mitchell et al. |
| 4,830,080 A | 5/1989 | Densen |
| D302,497 S | 8/1989 | Zapf |
| D309,381 S | 7/1990 | Buhk |
| D309,382 S | 7/1990 | Buhk |
| D309,384 S | 7/1990 | Buhk |
| D309,385 S | 7/1990 | Buhk |
| D309,386 S | 7/1990 | Buhk |
| 4,991,365 A | 2/1991 | Jackson |
| 5,038,539 A | 8/1991 | Kelley et al. |
| 5,056,285 A | 10/1991 | Frascaroli et al. |
| D321,801 S | 11/1991 | Friedman |
| 5,064,247 A | 11/1991 | Clark et al. |
| 5,067,294 A | 11/1991 | McGowan |
| 5,067,543 A | 11/1991 | Bove |
| D323,251 S | 1/1992 | Zapf |
| 5,086,597 A | 2/1992 | Kelley et al. |
| D325,309 S | 4/1992 | Worrell |
| 5,117,599 A | 6/1992 | Voss |
| 5,125,201 A | 6/1992 | Pieters et al. |
| D327,794 S | 7/1992 | Zapf |
| 5,132,681 A | 7/1992 | Yabe |
| D328,680 S | 8/1992 | Zapf |
| 5,144,777 A | 9/1992 | Fishel et al. |
| D330,295 S | 10/1992 | Zapf |
| 5,155,955 A | 10/1992 | Ball et al. |
| D330,641 S | 11/1992 | Zapf |
| D330,643 S | 11/1992 | Zapf |
| 5,159,793 A | 11/1992 | Deugo et al. |
| D331,335 S | 12/1992 | Zapf |
| D331,513 S | 12/1992 | Zapf |
| 5,171,060 A | 12/1992 | Kaye |
| 5,172,530 A | 12/1992 | Fishel et al. |
| 5,184,441 A | 2/1993 | Balfanz, Jr. |
| 5,204,149 A | 4/1993 | Phenicie et al. |
| 5,207,037 A | 5/1993 | Giles et al. |
| 5,218,799 A | 6/1993 | Appino |
| D337,003 S | 7/1993 | Rowland |
| 5,227,005 A | 7/1993 | Zodrow et al. |
| 5,247,773 A | 9/1993 | Weir |
| 5,301,484 A | 4/1994 | Jansson |
| 5,309,686 A | 5/1994 | Underwood et al. |
| 5,321,579 A | 6/1994 | Brown et al. |
| D348,786 S | 7/1994 | Tolleson et al. |
| 5,351,452 A | 10/1994 | Gates |
| 5,352,033 A | 10/1994 | Gresham et al. |
| 5,394,668 A | 3/1995 | Lim |
| 5,488,808 A | 2/1996 | Cahill et al. |
| D371,683 S | 7/1996 | Tolleson et al. |
| 5,544,593 A | 8/1996 | Canfield et al. |
| 5,592,794 A | 1/1997 | Tundaun |
| 5,598,674 A | 2/1997 | Lay |
| 5,600,926 A | 2/1997 | Ehrlich |
| 5,601,348 A | 2/1997 | Minkovski |
| 5,640,297 A | 6/1997 | Labaze |
| 5,642,593 A | 7/1997 | Shieh |
| 5,669,314 A | 9/1997 | Grant |
| 5,685,113 A | 11/1997 | Reuter et al. |
| 5,740,644 A | 4/1998 | Menchetti |
| 5,740,650 A | 4/1998 | Seiber et al. |
| 5,740,744 A | 4/1998 | Nashirozawa et al. |
| 5,746,035 A | 5/1998 | Seiber et al. |
| 5,778,612 A | 7/1998 | Kissinger et al. |
| 5,792,541 A | 8/1998 | Herrera |
| D397,880 S | 9/1998 | Saul et al. |
| D398,464 S | 9/1998 | Cronk et al. |
| 5,802,789 A | 9/1998 | Goodman et al. |
| 5,803,146 A | 9/1998 | Boon |
| 5,806,261 A | 9/1998 | Huebner et al. |
| 5,813,178 A | 9/1998 | Edwards |
| 5,820,991 A | 10/1998 | Cabo |
| 5,822,935 A | 10/1998 | Mitchell |
| 5,826,385 A | 10/1998 | Dykstra et al. |
| 5,836,121 A | 11/1998 | Hofman |
| 5,839,240 A | 11/1998 | Elsholz et al. |
| 5,852,904 A | 12/1998 | Yu et al. |
| 5,860,255 A | 1/1999 | Fishel |
| 5,864,997 A | 2/1999 | Kelly |
| 5,870,867 A | 2/1999 | Mitchell |
| 5,875,596 A | 3/1999 | Muller |
| 5,881,979 A | 3/1999 | Rozier et al. |
| 5,913,787 A | 6/1999 | Edwards |
| 5,931,429 A | 8/1999 | Hellwig et al. |
| 5,950,386 A | 9/1999 | Shipman et al. |
| 5,978,988 A | 11/1999 | Burchett |
| 6,000,180 A | 12/1999 | Goodman |
| 6,012,258 A | 1/2000 | Brown et al. |
| 6,029,418 A | 2/2000 | Wright |
| 6,047,508 A | 4/2000 | Goodman et al. |
| 6,058,667 A | 5/2000 | MacDonald et al. |
| 6,094,872 A | 8/2000 | Ward et al. |
| 6,112,472 A | 9/2000 | Van et al. |
| 6,122,871 A | 9/2000 | Russell et al. |
| 6,128,877 A | 10/2000 | Goodman et al. |
| 6,131,347 A | 10/2000 | Hornberger |
| 6,134,845 A | 10/2000 | Shipman et al. |
| 6,141,926 A | 11/2000 | Rossiter et al. |

(56) References Cited

U.S. PATENT DOCUMENTS

| | | |
|---|---|---|
| 6,158,179 A | 12/2000 | Ackerly et al. |
| 6,161,347 A | 12/2000 | Yu et al. |
| 6,189,270 B1 | 2/2001 | Jeffers et al. |
| 6,195,953 B1 | 3/2001 | Gitter et al. |
| 6,223,485 B1 | 5/2001 | Beck et al. |
| 6,250,020 B1 | 6/2001 | Shipman |
| 6,250,032 B1 | 6/2001 | Davis et al. |
| 6,260,321 B1 | 7/2001 | Rudduck |
| 6,282,854 B1 | 9/2001 | Vos et al. |
| 6,295,764 B1 | 10/2001 | Berridge et al. |
| 6,301,846 B1 | 10/2001 | Waalkes et al. |
| 6,311,441 B1 | 11/2001 | Beavers et al. |
| 6,330,773 B1 | 12/2001 | MacDonald et al. |
| 6,341,457 B1 | 1/2002 | Aerts et al. |
| 6,363,663 B1 | 4/2002 | Kane et al. |
| 6,367,215 B1 | 4/2002 | Laing |
| 6,393,782 B1 | 5/2002 | Berridge et al. |
| 6,393,783 B2 | 5/2002 | Emaus et al. |
| 6,397,533 B1 | 6/2002 | Hornberger et al. |
| 6,397,537 B2 | 6/2002 | Auer et al. |
| 6,415,567 B1 | 7/2002 | Mead et al. |
| 6,446,396 B1 | 9/2002 | Marangoni |
| 6,446,404 B1 * | 9/2002 | Bassin ............... A47B 96/18 428/45 |
| 6,481,168 B1 | 11/2002 | Hodges et al. |
| 6,484,465 B2 | 11/2002 | Higgins |
| 6,490,154 B2 | 12/2002 | Thompson |
| 6,497,075 B1 | 12/2002 | Schreiner et al. |
| 6,530,181 B1 | 3/2003 | Seiber et al. |
| 6,536,175 B2 | 3/2003 | Conterno |
| 6,557,310 B2 | 5/2003 | Marshall et al. |
| 6,571,855 B1 | 6/2003 | Goldsmith et al. |
| 6,581,344 B1 | 6/2003 | Niewiadomski et al. |
| 6,591,563 B2 | 7/2003 | King et al. |
| 6,612,077 B2 | 9/2003 | Parshad |
| 6,615,556 B2 | 9/2003 | Cates et al. |
| 6,619,008 B1 | 9/2003 | Shivak et al. |
| 6,658,805 B1 | 12/2003 | Yu et al. |
| 6,668,514 B2 | 12/2003 | Skov |
| D485,096 S | 1/2004 | Overthun et al. |
| 6,684,929 B2 | 2/2004 | MacDonald et al. |
| 6,688,056 B2 | 2/2004 | Von et al. |
| 6,701,677 B2 | 3/2004 | Gresham et al. |
| 6,711,871 B2 | 3/2004 | Beirise et al. |
| 6,729,085 B2 | 5/2004 | Newhouse et al. |
| 6,735,908 B2 | 5/2004 | Edwards |
| 6,748,710 B2 | 6/2004 | Gresham et al. |
| 6,761,004 B2 | 7/2004 | Anglin et al. |
| 6,775,953 B2 | 8/2004 | Burken et al. |
| 6,799,404 B2 | 10/2004 | Spransy |
| 6,807,776 B2 | 10/2004 | Gresham et al. |
| 6,820,388 B2 | 11/2004 | Newhouse et al. |
| 6,851,226 B2 | 2/2005 | MacGregor et al. |
| 6,865,853 B2 | 3/2005 | Burken et al. |
| 6,883,277 B2 | 4/2005 | Wiechecki et al. |
| 6,889,477 B1 | 5/2005 | Kottman |
| 6,920,727 B2 | 7/2005 | Yu et al. |
| 6,928,785 B2 | 8/2005 | Shipman et al. |
| 6,941,716 B2 | 9/2005 | Kottman |
| 6,944,993 B1 | 9/2005 | Jilk et al. |
| 6,951,085 B2 | 10/2005 | Hodges et al. |
| 6,964,138 B2 | 11/2005 | Carroll et al. |
| 6,981,454 B2 | 1/2006 | Burdick |
| 6,990,909 B2 | 1/2006 | Gosling et al. |
| 6,993,875 B2 | 2/2006 | Rudduck |
| 7,051,482 B2 | 5/2006 | MacDonald et al. |
| 7,150,127 B2 | 12/2006 | Underwood et al. |
| 7,210,270 B1 | 5/2007 | King et al. |
| 7,268,311 B2 | 9/2007 | Tanabe |
| 7,310,918 B1 | 12/2007 | Reuter et al. |
| 7,434,790 B1 | 10/2008 | Hansen |
| 7,451,577 B2 | 11/2008 | Little, Jr. |
| 7,461,484 B2 | 12/2008 | Battey et al. |
| 7,540,115 B2 | 6/2009 | Metcalf et al. |
| 7,562,504 B2 | 7/2009 | Herbst et al. |
| 7,603,821 B2 | 10/2009 | Eberlein et al. |
| 7,644,552 B2 | 1/2010 | Kuipers et al. |
| 7,645,954 B2 | 1/2010 | Yasuda |
| 7,661,237 B2 | 2/2010 | Jakob-Bamberg et al. |
| 7,707,790 B2 | 5/2010 | Williams et al. |
| 7,818,932 B2 | 10/2010 | Eberlein et al. |
| 7,827,745 B2 | 11/2010 | Franceschet |
| 7,832,154 B2 | 11/2010 | Gosling et al. |
| 7,841,142 B2 | 11/2010 | Towersey et al. |
| 7,856,777 B2 | 12/2010 | Lamfers et al. |
| 7,861,474 B2 | 1/2011 | Houle et al. |
| 7,887,250 B1 | 2/2011 | Wang |
| 7,891,148 B2 | 2/2011 | Underwood et al. |
| 7,908,805 B2 | 3/2011 | Metcalf et al. |
| 7,913,459 B2 | 3/2011 | Ball et al. |
| 7,918,064 B2 | 4/2011 | Singleton |
| 7,922,224 B2 | 4/2011 | Arias |
| 7,984,598 B2 | 7/2011 | Gosling et al. |
| 8,015,766 B2 | 9/2011 | Gosling et al. |
| 8,015,767 B2 | 9/2011 | Glick et al. |
| 8,024,901 B2 | 9/2011 | Gosling et al. |
| 8,033,059 B2 | 10/2011 | Contois et al. |
| 8,033,068 B2 | 10/2011 | Luettmann et al. |
| 8,046,957 B2 | 11/2011 | Towersey et al. |
| 8,151,527 B2 | 4/2012 | Gosling et al. |
| 8,151,533 B2 | 4/2012 | Krieger |
| 8,176,707 B2 | 5/2012 | Gosling et al. |
| 8,215,061 B2 | 7/2012 | Gosling et al. |
| 8,272,180 B2 | 9/2012 | Glick et al. |
| 8,307,591 B2 | 11/2012 | Steinle et al. |
| 8,322,102 B2 | 12/2012 | Krieger |
| 8,393,122 B2 | 3/2013 | Henriott et al. |
| 8,474,193 B2 | 7/2013 | Sutton et al. |
| 8,479,026 B2 | 7/2013 | Lakshmanan et al. |
| 8,534,021 B2 | 9/2013 | Liu et al. |
| 8,601,749 B2 | 12/2013 | Von et al. |
| 8,613,168 B2 | 12/2013 | Von et al. |
| 8,615,936 B2 | 12/2013 | Von et al. |
| 8,646,739 B2 | 2/2014 | Moyer |
| 8,656,648 B2 | 2/2014 | Liegeois et al. |
| 8,683,745 B2 | 4/2014 | Artwohl et al. |
| 8,729,446 B2 | 5/2014 | Verfuerth |
| D710,025 S | 7/2014 | Johnson et al. |
| 8,910,435 B2 | 12/2014 | Feldpausch et al. |
| D725,638 S | 3/2015 | Hofman et al. |
| 8,966,839 B2 | 3/2015 | Rebman et al. |
| 9,003,731 B2 | 4/2015 | Gosling et al. |
| D731,833 S | 6/2015 | Fifield et al. |
| 9,084,489 B2 | 7/2015 | Gosling et al. |
| 9,206,600 B2 | 12/2015 | Von et al. |
| 9,284,729 B2 | 3/2016 | Von et al. |
| 9,562,354 B2 | 2/2017 | Strassle et al. |
| 9,673,851 B2 | 6/2017 | Pelster |
| 9,747,823 B2 | 8/2017 | Lorenzini |
| 10,016,056 B2 | 7/2018 | Sklansky |
| 2001/0039774 A1 | 11/2001 | Beirise et al. |
| 2002/0053174 A1 | 5/2002 | Barmak |
| 2002/0104271 A1 | 8/2002 | Gallant |
| 2002/0108330 A1 | 8/2002 | Yu et al. |
| 2002/0121056 A1 | 9/2002 | Von et al. |
| 2002/0124514 A1 | 9/2002 | Higgins |
| 2002/0129574 A1 | 9/2002 | Newhouse et al. |
| 2002/0144476 A1 | 10/2002 | Mastelli |
| 2002/0157335 A1 | 10/2002 | Vos |
| 2003/0005514 A1 | 1/2003 | Kunkel |
| 2003/0060080 A1 | 3/2003 | Rees |
| 2003/0089057 A1 | 5/2003 | Wiechecki et al. |
| 2003/0154673 A1 | 8/2003 | MacGregor et al. |
| 2003/0163967 A1 | 9/2003 | Sims |
| 2003/0193709 A1 | 10/2003 | Mallya et al. |
| 2003/0196388 A1 | 10/2003 | Edwards |
| 2003/0221384 A1 | 12/2003 | Burken et al. |
| 2004/0010998 A1 | 1/2004 | Turco |
| 2004/0020137 A1 | 2/2004 | Battey et al. |
| 2004/0035074 A1 | 2/2004 | Stanescu et al. |
| 2004/0045225 A1 | 3/2004 | Weiss |
| 2004/0093805 A1 | 5/2004 | Underwood et al. |
| 2004/0139677 A1 | 7/2004 | Mulas et al. |
| 2004/0177573 A1 | 9/2004 | Newhouse et al. |

(56) References Cited

U.S. PATENT DOCUMENTS

| | | |
|---|---|---|
| 2005/0005527 A1 | 1/2005 | Metcalf et al. |
| 2005/0086871 A1 | 4/2005 | MacGregor et al. |
| 2005/0204596 A1 | 9/2005 | Peng |
| 2006/0042141 A1 | 3/2006 | Hansen et al. |
| 2006/0048457 A1 | 3/2006 | Yang |
| 2006/0050063 A1 | 3/2006 | Tanabe |
| 2006/0052097 A1 | 3/2006 | Struthers |
| 2006/0059806 A1* | 3/2006 | Gosling .............. E04B 2/7424 52/238.1 |
| 2006/0073272 A1* | 4/2006 | Carel ................. D06F 34/28 427/126.3 |
| 2006/0080939 A1 | 4/2006 | Bledsoe |
| 2006/0097989 A1 | 5/2006 | Ho |
| 2006/0185276 A1 | 8/2006 | Pai |
| 2006/0210755 A1 | 9/2006 | Blazek |
| 2007/0070192 A1 | 3/2007 | Shalam |
| 2007/0077387 A1 | 4/2007 | Riccobene |
| 2007/0242174 A1 | 10/2007 | Maisuradze |
| 2007/0277449 A1 | 12/2007 | Burns |
| 2007/0289225 A1 | 12/2007 | Kern et al. |
| 2008/0069632 A1 | 3/2008 | Gosling et al. |
| 2008/0295426 A1 | 12/2008 | Milligan et al. |
| 2008/0302054 A1 | 12/2008 | Gosling et al. |
| 2009/0021122 A1 | 1/2009 | Green et al. |
| 2009/0160796 A1 | 6/2009 | Jiang |
| 2009/0174998 A1 | 7/2009 | Struthers |
| 2009/0241437 A1 | 10/2009 | Steinle et al. |
| 2009/0256040 A1 | 10/2009 | Lee |
| 2009/0260311 A1 | 10/2009 | Boyer et al. |
| 2009/0272056 A1 | 11/2009 | Koupal |
| 2009/0293406 A1 | 12/2009 | Gosling et al. |
| 2009/0324962 A1 | 12/2009 | Manetti |
| 2010/0002298 A1 | 1/2010 | Sugino et al. |
| 2010/0022998 A1 | 1/2010 | Sugino |
| 2010/0043142 A1 | 2/2010 | Whitford |
| 2010/0050548 A1 | 3/2010 | Krieger |
| 2010/0067969 A1 | 3/2010 | Kang |
| 2010/0102960 A1 | 4/2010 | Simon et al. |
| 2010/0138581 A1 | 6/2010 | Bird |
| 2010/0192511 A1 | 8/2010 | Gosling et al. |
| 2010/0223857 A1 | 9/2010 | Sutton et al. |
| 2010/0236173 A1 | 9/2010 | Pacha |
| 2010/0287858 A1 | 11/2010 | Israeli et al. |
| 2010/0307086 A1 | 12/2010 | Hibbs |
| 2011/0197519 A1 | 8/2011 | Henriott et al. |
| 2012/0033375 A1 | 2/2012 | Madonna |
| 2012/0102844 A1 | 5/2012 | Damo |
| 2012/0141735 A1 | 6/2012 | Chevallier |
| 2012/0176776 A1 | 7/2012 | Van et al. |
| 2012/0186164 A1 | 7/2012 | Pensi |
| 2012/0293855 A1 | 11/2012 | Shrivastava et al. |
| 2012/0317899 A1 | 12/2012 | Von et al. |
| 2013/0025220 A1 | 1/2013 | Yu et al. |
| 2013/0094168 A1 | 4/2013 | Jaeger |
| 2013/0157493 A1 | 6/2013 | Brown |
| 2014/0102021 A1 | 4/2014 | Gosling et al. |
| 2014/0133137 A1 | 5/2014 | Kiss |
| 2014/0137495 A1 | 5/2014 | Ariza |
| 2014/0157693 A1 | 6/2014 | Schumacher |
| 2014/0310873 A1 | 10/2014 | Gosling et al. |
| 2014/0338272 A1 | 11/2014 | Shiao |
| 2014/0362050 A1 | 12/2014 | Wilson |
| 2015/0007516 A1 | 1/2015 | Glick et al. |
| 2015/0027753 A1 | 1/2015 | Huang et al. |
| 2015/0029412 A1 | 1/2015 | Kishioka |
| 2015/0085439 A1 | 3/2015 | Lee |
| 2015/0118869 A1 | 4/2015 | Brown et al. |
| 2015/0343884 A1 | 12/2015 | Rousselet |
| 2015/0354212 A1 | 12/2015 | Von et al. |
| 2016/0007487 A1 | 1/2016 | Lee |
| 2016/0032644 A1 | 2/2016 | Geller et al. |
| 2016/0052241 A1 | 2/2016 | Zhang |
| 2016/0053485 A1 | 2/2016 | Von et al. |
| 2016/0071664 A1 | 3/2016 | Cohen |
| 2016/0168863 A1 | 6/2016 | Kwan et al. |
| 2016/0211878 A1 | 7/2016 | Pelster |
| 2016/0282983 A1* | 9/2016 | Chang ................. G06F 3/0446 |
| 2016/0306384 A1 | 10/2016 | Carvey |
| 2016/0327300 A1 | 11/2016 | Ribbich |
| 2016/0348361 A1 | 12/2016 | Smed et al. |
| 2016/0363143 A1 | 12/2016 | Druce |
| 2017/0038896 A1* | 2/2017 | Lee ....................... G06F 3/044 |
| 2017/0089066 A1* | 3/2017 | Gosling ............... E04B 2/7453 |
| 2017/0256927 A1 | 9/2017 | Padilla |
| 2018/0002924 A1* | 1/2018 | Gosling ............... E04B 2/7401 |
| 2018/0195290 A1 | 7/2018 | Seffer et al. |
| 2018/0199451 A1 | 7/2018 | Van De Sype et al. |

FOREIGN PATENT DOCUMENTS

| | | |
|---|---|---|
| CA | 2011977 A1 | 10/1990 |
| CA | 2040822 A1 | 11/1991 |
| CA | 1294107 C | 1/1992 |
| CA | 2002674 C | 3/1993 |
| CA | 2162300 A1 | 5/1997 |
| CA | 2248428 A1 | 3/2000 |
| CA | 2273631 C | 10/2001 |
| CA | 2324050 A1 | 4/2002 |
| CA | 2430163 A1 | 7/2002 |
| CA | 2359165 A1 | 4/2003 |
| CA | 2310869 C | 8/2003 |
| CA | 2476368 A1 | 1/2006 |
| CA | 2535213 A1 | 8/2006 |
| CA | 2428593 C | 8/2007 |
| CA | 2359547 C | 2/2008 |
| CA | 2348060 C | 7/2008 |
| CA | 2591176 A1 | 12/2008 |
| CA | 2634407 A1 | 12/2008 |
| CA | 2349964 C | 10/2009 |
| CA | 2840843 A1 | 12/2013 |
| CA | 2863783 A1 | 4/2014 |
| CH | 686795 A5 | 6/1996 |
| CN | 201197135 | 2/2009 |
| CN | 202069245 U | 12/2011 |
| DE | 1659015 A1 | 11/1971 |
| DE | 2941754 | 4/1981 |
| DE | 3900397 | 7/1990 |
| DE | 4207753 A1 | 9/1993 |
| DE | 9307530 U1 | 9/1994 |
| DE | 29620551 U1 | 3/1997 |
| DE | 69316247 T2 | 7/1998 |
| DE | 19960535 A1 | 6/2001 |
| DE | 202004017808 U1 | 1/2005 |
| DE | 202012103275 | 9/2012 |
| DE | 102012308969 A1 | 11/2013 |
| EP | 0000913 | 3/1979 |
| EP | 0302564 A2 | 2/1989 |
| EP | 378133 | 7/1990 |
| EP | 0443202 A1 | 8/1991 |
| EP | 0557092 A1 | 8/1993 |
| EP | 0657595 A1 | 6/1995 |
| EP | 0886016 A1 | 12/1998 |
| EP | 0963719 A2 | 12/1999 |
| EP | 1035264 A1 | 9/2000 |
| EP | 1094167 A2 | 4/2001 |
| EP | 1526637 A1 | 4/2005 |
| EP | 2273348 | 1/2011 |
| EP | 2730892 | 5/2014 |
| EP | 2736382 A1 | 6/2014 |
| FR | 1526637 A | 5/1968 |
| FR | 2218447 A1 | 9/1974 |
| FR | 2499352 | 8/1982 |
| GB | 1013451 A | 12/1965 |
| GB | 1259347 A | 1/1972 |
| GB | 1400613 A | 7/1975 |
| GB | 2221946 A | 2/1990 |
| GB | 2283071 A | 4/1995 |
| GB | 2323780 | 7/1998 |
| GB | 2353541 A | 2/2001 |
| GB | 2374612 A | 10/2002 |
| JP | 03-017333 A | 1/1991 |
| JP | 2003-105908 A | 4/2003 |
| JP | 2005-155223 A | 6/2005 |
| KR | 10-2000-0049102 A | 7/2000 |

(56) References Cited

FOREIGN PATENT DOCUMENTS

| | | |
|---|---|---|
| KR | 10-2007-0077502 A | 7/2007 |
| KR | 1020120040541 | 4/2012 |
| KR | 10-1311065 B1 | 9/2013 |
| KR | 10-1311068 B1 | 9/2013 |
| WO | 92/12074 A2 | 7/1992 |
| WO | 92/12300 A1 | 7/1992 |
| WO | 93/15970 A1 | 8/1993 |
| WO | 93/23629 A1 | 11/1993 |
| WO | 94/02695 A1 | 2/1994 |
| WO | 9626336 | 8/1996 |
| WO | 96/33323 A1 | 10/1996 |
| WO | 97/46770 A1 | 12/1997 |
| WO | 98/07357 A1 | 2/1998 |
| WO | 98/16699 A1 | 4/1998 |
| WO | 9816870 | 4/1998 |
| WO | 98/29623 A1 | 7/1998 |
| WO | 98/37292 A1 | 8/1998 |
| WO | 98/51876 A1 | 11/1998 |
| WO | 99/46453 A2 | 9/1999 |
| WO | 99/46455 A2 | 9/1999 |
| WO | 99/46458 A1 | 9/1999 |
| WO | 99/53156 A1 | 10/1999 |
| WO | 99/58780 A1 | 11/1999 |
| WO | 99/63177 A1 | 12/1999 |
| WO | 00/15918 A1 | 3/2000 |
| WO | 00/75440 A1 | 12/2000 |
| WO | 00/75447 A1 | 12/2000 |
| WO | 01/71241 A1 | 9/2001 |
| WO | 02/08851 A2 | 1/2002 |
| WO | 02/52111 A1 | 7/2002 |
| WO | 2002/103129 A1 | 12/2002 |
| WO | 03/71045 A2 | 8/2003 |
| WO | 2003/104581 A2 | 12/2003 |
| WO | 2004114105 | 12/2004 |
| WO | 2006/005968 A1 | 1/2006 |
| WO | 2006/127804 A2 | 11/2006 |
| WO | 2006123335 | 11/2006 |
| WO | 2009109538 | 9/2009 |
| WO | 2010/121788 A1 | 10/2010 |
| WO | 2011096580 | 8/2011 |
| WO | 2011/150467 A1 | 12/2011 |
| WO | 2012/173930 A2 | 12/2012 |
| WO | 2013/101298 A1 | 7/2013 |
| WO | 2013/130871 A1 | 9/2013 |
| WO | 2013/185141 A1 | 12/2013 |
| WO | 2013/188211 A1 | 12/2013 |
| WO | 2013/188235 A1 | 12/2013 |
| WO | 2014/039278 A2 | 3/2014 |
| WO | 2014/055883 A1 | 4/2014 |
| WO | 2014132715 | 9/2014 |
| WO | 2015017198 | 2/2015 |
| WO | 2016/059224 A1 | 4/2016 |
| WO | 2016/059244 A1 | 4/2016 |
| WO | 2016/149362 A1 | 9/2016 |
| WO | 20170213960 | 12/2017 |
| WO | 2018009936 | 1/2018 |

OTHER PUBLICATIONS

European Office Action for application No. 16765651.1-1002 dated Aug. 8, 2019.
Second Search Report and Written Opinion for application No. 11201606345U dated Feb. 13, 2018.
Final Office Action for U.S. Appl. No. 15/741,180, dated Feb. 21, 2019.
Non-Final Office Action for U.S. Appl. No. 15/038,694 dated Jan. 18, 2018.
European Search Report and Written Opinion for application No. PCT/US2016022634 dated Oct. 23, 2018.
European Search Report for application No. EP17825076 dated Feb. 10, 2020.
Final Office Action for U.S. Appl. No. 15/741,180 dated Jan. 23, 2020.
Written Opinion for Singapore Application No. 11201800368R dated Feb. 25, 2020.
International Search Report and Written Opinion for application No. PCT/US2016/022634 dated Jul. 6, 2016.
International Search Report on Patentability Chapter I for application No. PCT/US2016/022634 dated Sep. 19, 2017.
International Search Report and Written Opinion for application No. PCT/US2017/041387 dated Oct. 19, 2017.
International Search Report and Written Opinion for application No. PCT/US2017/035520 dated Aug. 18, 2017.
Achieving the Atkins Aesthetic: Ki's new ThinLine option for its award-winning Genius Architectural Wall flaunts a slimmer figure, [Publication Date Unlisted], Dated Jun. 14, 2004.
Canadian Office Action for Application No. 2,800,414 dated Jul. 15, 2015.
Decision Denying Institution (IPR2015-01690), *Allsteal v. DIRTT Environmental Solutions* dated Jan. 27, 2016.
Decision Granting Institution (IPR2015-01691), *Allsteal v. DIRTT Environmental Solutions* dated Feb. 2, 2016.
Declaration of Robert Witti, Exhibit No. 1033 (IPR2015-01691), *Allsteel v. DIRTT Environmental Solutions*, dated Jul. 21, 2016.
Deposition of Joseph J. Beaman, Jr., Exhibit No. 2003 (IPR2015-01691), *Allsteal v. DIRTT Environmental Solutions*, dated Apr. 1, 2016.
European Communication pursuant to Article 94(3) EPC for European Application No. 15751602.2, dated Jul. 7, 2020, 4 pages.
European Communication pursuant to Article 94(3) EPC for European Application No. 15752109.7, dated Jul. 7, 2020, 5 pages.
European Communication pursuant to Article 94(3) EPC for European Application No. 15752752.4, dated Jul. 7, 2020, 4 pages.
European Communication pursuant to Article 94(3) EPC received for European Patent Application No. 15804050.1, dated Jul. 16, 2020, 5 pages.
European Search Report and Search Opinion Received for EP Application No. 15804050.1, dated Dec. 11, 2017, 7 pages.
European Search Report for PCT/US2012/042314 dated Jan. 29, 2015.
European Search Report for PCT/US2015015943, datd Sep. 27, 2017.
European Supplementary Search Report and Opinion for European Application No. 15751602.2, dated Dec. 11, 2017, 7 pages.
European Supplementary Search Report and Opinion for European Application No. 15752109.7, dated Sep. 27, 2017, 8 pages.
European Supplementary Search Report and Opinion for European Application No. 15752752.4, dated Dec. 11, 2017, 6 pages.
Ex Parte Quayle Action received for U.S. Appl. No. 14/032,931, mailed on Jul. 24, 2020, 6 pages.
Exhibit 2010 Oral Deposition of Joseph J. Beaman Jr., Ph.D. (IPR2015-01691), *Allsteel v. DIRTI Environmental Solutions*, dated Nov. 18, 2018.
Expert Declaration of Joseph J. Beaman, Jr., Exhibit No. 1018 (IPR2015-01691), *Allsteel v. DIRTT Environmental Solutions*, dated Aug. 5, 2015.
Final Office Action for U.S. Appl. No. 14/657,837 dated Nov. 2, 2015.
Final Office Action for U.S. Appl. No. 15/023,990 dated Sep. 7, 2018.
Final Office Action for U.S. Appl. No. 15/023,990 dated Oct. 3, 2017.
Final Office Action for U.S. Appl. No. 14/681,874 dated Apr. 15, 2016.
Final Written Decision (IPR2015-01691), *Allsteal v. DIRTT Environmental Solutions* dated Jan. 19, 2017.
Final Written Decision on Remand (IPR2015-01691), *Allsteel v. DIRTT Environmental Solutions*, dated Apr. 22, 2019.
Genius Architectural Walls, [Publication Date Unlisted], Copyright Date 2004 by KI, Document Code KI-00473/HC/IT/PP/504.
International Search Report and Written Opinion for PCT/US2012/041906 dated Jan. 31, 2013.
International Search Report and Written Opinion for PCT/US2012/042314 dated Jun. 13, 2012.
International Search Report for application No. PCT/US15/015931 dated Apr. 30, 2015.

(56) References Cited

OTHER PUBLICATIONS

International Search Report for application No. PCT/US15/015943 dated May 14, 2015.
International Search Report for application No. PCT/US15/15920 dated May 22, 2015.
International Search Report for application No. PCT/US15/34491 dated Sep. 15, 2015.
KI Genius Full-Height Moveable Walls, [Publication Date Unlisted], Copyright Date 2003 by KI, Document Code KI-00506/HC/PP/803.
KI Improves STC Rating on its Genius Architectural Wall and receives ICC approval, [Publication Date Unlisted], dated Feb. 26, 2004.
Lifespace Environmental Wall Systems, [Publication Date Unlisted], Dated Apr. 1995.
Non-Final Office Action for U.S. Appl. No. 14/305,819, dated Jul. 11, 2017.
Non-Final Office Action for U.S. Appl. No. 14/681,874, dated Jun. 15, 2016.
Non-Final Office Action for U.S. Appl. No. 14/683,684 dated Apr. 23, 2018.
Non-Final Office Action for U.S. Appl. No. 15/023,990 dated Mar. 15, 2018.
Non-Final Office Action for U.S. Appl. No. 15/023,990 dated Mar. 6, 2017.
Non-Final Office Action for U.S. Appl. No. 15/177,084 dated Jan. 29, 2018.
Non-Final Office Action for U.S. Appl. No. 15/026,566 dated Sep. 21, 2017.
Non-Final Office Action in U.S. Appl. No. 14/903,035 dated Feb. 16, 2017.
Non-Final Office Action received for U.S. Appl. No. 15/026,566, dated Sep. 21, 2020, 15 pages.
Notice of Allowance for U.S. Appl. No. 29/492,776 dated Jan. 21, 2016.
Notice of Allowance for U.S. Appl. No. 29/493,280 dated Jan. 21, 2016.
Notice of Allowance for U.S. Appl. No. 14/657,837, dated Apr. 12, 2016.
Notice of Allowance for U.S. Appl. No. 14/683,684 dated Jan. 24, 2020.
Notice of Allowance for U.S. Appl. No. 14/903,035 dated Aug. 14, 2017.
Notice of Allowance for U.S. Appl. No. 15/028,000, dated Jul. 7, 2017.
Office Action for U.S. Appl. No. 14/032,931 dated Jul. 16, 2015.
Office Action for U.S. Appl. No. 14/681,874 dated Jul. 23, 2015.
Office Insight, [Publication Date Unlisted], Dated Mar. 23, 2009.
Patent Owner's Preliminary Response for Case No. IPR2015-01690 Dated Nov. 13, 2015.
Patent Owner's Preliminary Response for Case No. IPR2015-01691 dated Nov. 18, 2015.
Patent Owners Response (IPR2015-01691), *Allsteel* v. *DIRTT Environmental Solutions*, dated May 2, 2016.
Patent Owners Response to Petitioners Supplemental Brief Addressing Newly Instituted Claims 8, 11, 13, and 21-23 IPR2015-01691), *Allsteel* v. *DIRTT Environmental Solutions*, dated Nov. 28, 2018.

Petition for Inter Partes Review of U.S. Pat. No. 8,024,901, IPR2015-01690, filed Aug. 7, 2015.
Petition for Inter Partes Review of U.S. Pat. No. 8,024,901, IPR2015-01691, filed Aug. 7, 2015.
Petitioners Reply to Patent Owners Responsive Brief (IPR2015-01691), *Allsteel* v. *DIRTT Environmental Solutions*, dated Dec. 12, 2018.
Petitioners Supplemental Brief Addressing Newly Instituted Claims 8, 11, 13 and 21-23 (IPR2015-01691), *Allsteel* v. *DIRTI Environmental Solutions*, dated Oct. 19, 2018.
Press Release—"KI unveils Genius Full Heigth Movable Wall Microsite with new interactive features", Accessed on Aug. 14, 2015 at http://web.archive.org/web/20040506230219/http://www.ki.com/about_press_release.asp?id=49.
Reply Declaration of Joseph J. Beaman, Jr., Exhibit No. 1032 (IPR2015-01691), *Allsteel* v. *DIRTT Environmental Solutions*, dated Jul. 21, 2016.
Reply to Patent Owners Response (IPR2015-01691), *Allsteel* v. *DIRTI Environmental Solutions*, dated Jul. 21, 2016.
Restriction Requirement for U.S. Appl. No. 14/683,684 dated Oct. 5, 2017.
SMED International—Lifespace—Technical Information, [Publication Date Unlisted], Dated Jan. 1, 1996.
Supplemental Declaration of Joseph J. Beaman Jr. (IPR2015-01691), *Allsteel* v. *DIRTT Environmental Solutions*, dated Oct. 19, 2018.
Supplementary European Search Report for application EP 15752752 dated Nov. 30, 2017.
Supplementary Search Report for application EP 15751602 dated Nov. 21, 2017.
Supplementary Search Report for application EP 15804050 dated Nov. 30, 2017.
Teknionaltos—Price and Product Guide Update, [Publication Date Unlisted], Dated Feb. 2002.
U.S. Specifier Guide and Price Book, [Publication Date Unlisted], Dated Jan. 1998.
Singapore Supplementary Examination Report received for Singapore Patent Application No. 11201606345U, dated Dec. 4, 2020, 2 pages.
International Preliminary Report on Patentabliity received for PCT Patent Application No. PCT/US2017/035520, dated Dec. 20, 2018, 13 pages.
Supplementary European Search Report and Search Opinion Received for EP Application No. 17810747, dated Mar. 29, 2019, 6 pages.
Examiner Interview Summary received for U.S. Appl. No. 15/026,566, dated Dec. 14, 2020, 3 pages.
International Search Report and Written Opinion for application No. PCT/US2016/022634 dated Jun. 26, 2016.
Non-Final Office Action for U.S. Appl. No. 15/741,180 dated Oct. 5, 2018.
Non-Final Office Action received for U.S. Appl. No. 15/741,489, dated Oct. 27, 2020, 7 pages.
Office Action received for European Patent Application No. 16765651.1, dated Feb. 15, 2021, 5 pages.
Office Action received for European Patent Application No. 17/810,747, dated Apr. 30, 2021, 6 pages.

* cited by examiner

GLASS SUBSTRATES WITH TOUCHSCREEN TECHNOLOGY

CROSS-REFERENCE TO RELATED APPLICATIONS

The present invention is a 35 U.S.C. § 371 U.S. National Stage of PCT Application No. PCT/US2017/035520, filed Jun. 1, 2017, which claims the benefit of U.S. Patent Application No. 62/348,718, filed on Jun. 10, 2016, and entitled GLASS SUBSTRATES WITH TOUCHSCREEN TECHNOLOGY, the entire content of which is incorporated herein by reference.

BACKGROUND

1. Technical Field

This disclosure relates generally to modular wall systems. Implementations of the present invention relate generally to reconfigurable wall systems, and more particularly, reconfigurable modular wall systems and apparatuses comprising reconfigurable modules, components, and design elements.

2. Background and Relevant Art

Panels and other structures made of glass or other shatterable materials can provide an aesthetically pleasing look or provide useful functionality when applied as a surface or panel to a wall. However, there can also be a number of drawbacks to its use. Glass, as well as ceramics, some resins, and other shatterable materials, are fragile and subject to breakage. Because of the properties of glass, building codes can be more stringent when glass is applied as a finish material.

Wall systems, or dividers as they are sometimes called, are used most commonly in an office environment to separate work areas and to give people privacy where permanent walls are lacking, undesirable, or impractical. Previous wall systems have lacked some or all of these attributes. Some are difficult to reconfigure or move without significant amounts of labor and dislocation. Most systems lack the flexibility to quickly and simply change the ordering, orientation, height, and/or relationship between modular wall components in order to change the aesthetics and/or functionality of an existing wall. Other systems lack the flexibility to use or substitute different types of modular tiles or panels at a designated location or to replace a module in the middle of a wall without taking apart the entire wall. There also is a need to be able to use the same wall system concepts, components, and connection interface(s) in commercial, residential, industrial and other applications without a system overhaul.

Accordingly, there is a need for reconfigurable wall systems having panels or other structures made from glass or other shatterable materials that limit or avoid these disadvantages.

BRIEF SUMMARY

Embodiments described herein are generally directed to modular wall systems including modular wall systems that include windows, panels, passthroughs, or other such objects made from glass or other shatterable materials (e.g., ceramics, resins, etc.). For instance, in one embodiment, a modular wall system is provided which includes a modular frame, one or more tiles attached to the modular frame, a decorative panel positioned between at least one of the tiles and an interconnected conductive plate, and conductive plates that are configured to hold an electrical potential and detect an electrical capacitance through the decorative panel at an identified position on the conductive plate when touched.

In another embodiment, a modular wall system is provided which includes a modular frame, tiles attached to the modular frame, and conductive plates that are configured to hold an electrical potential and detect an electrical capacitance at an identified position on the conductive plate when touched. In this example, at least one of the conductive plates has a pocket formed therein. The modular wall also includes an inductive plate disposed in the pocket of the conductive plate. In this manner, the inductive plate provides a hidden switching location that, when activated, triggers transmission of a signal to a specified destination.

Certain embodiments of a modular wall system include a modular outer frame. A decorative panel is secured to the modular outer frame. A conductive plate may be secured between two outer tiles of the modular panel, the conductive plate being embedded within the modular wall panel.

Certain embodiments include conductive plates made of steel. Other conductive materials may also be used. A backer frame secures the conductive plates to the inside of the modular panel. A control unit may be included also. The control unit may supply power to, and receives information or signals from, the conductive plates.

Additional features and advantages of exemplary implementations of the present disclosure will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

Embodiments described herein may include aesthetic panels, tiles, surfaces, and other such structures comprising wood, plastic, fabric, glass and/or other shatterable materials (e.g., ceramics, plasters, resins, etc.) attached to and/or reinforced by a substrate to form a reinforced tile. In some embodiments, such reinforced tiles can include one or more connectors (e.g. clips, clamps, ties, protrusions, or other fasteners or coupling means) attached to the substrate on a surface of the substrate opposite the glass. This provides the reinforced tile with connectability to a modular wall and/or reconfigurable wall system.

Embodiments herein thus describe modular wall systems including modular wall systems that include windows, panels, passthroughs, or other such objects made from glass or other shatterable materials. In one embodiment, for example, a modular wall system is provided that includes the following: a modular frame, one or more tiles attached to the modular frame, a decorative panel positioned between at least one of the tiles and an interconnected conductive plate, and one or more conductive plates that are configured to hold an electrical potential and detect an electrical capacitance through the decorative panel at an identified position on the conductive plate when touched.

In some cases, a modular wall system is provided that includes a modular frame, tiles attached to the modular frame, and conductive plates that are configured to hold an electrical potential and detect an electrical capacitance at an identified position on the conductive plate when touched. In such cases, at least one of the conductive plates has a pocket formed therein. The modular wall system also includes an inductive plate disposed in the pocket of the conductive plate. In this manner, the inductive plate provides a hidden switching location that, when activated, triggers transmission of a signal to a specified destination.

Certain embodiments of a modular wall system include a modular outer frame. A decorative panel is secured to the modular outer frame. A conductive plate may be secured between two outer tiles of the modular panel, where the conductive plate is embedded within the modular wall panel. Some embodiments may include conductive plates made of steel. Other conductive materials may also be used including copper and other metals, conductive polymers, semiconductors or other materials. A backer frame may be implemented to secure the conductive plates to the inside of the modular panel. A control unit may also be included. The control unit may supply power to, and receive information or signals from, the conductive plates.

Figure 1:
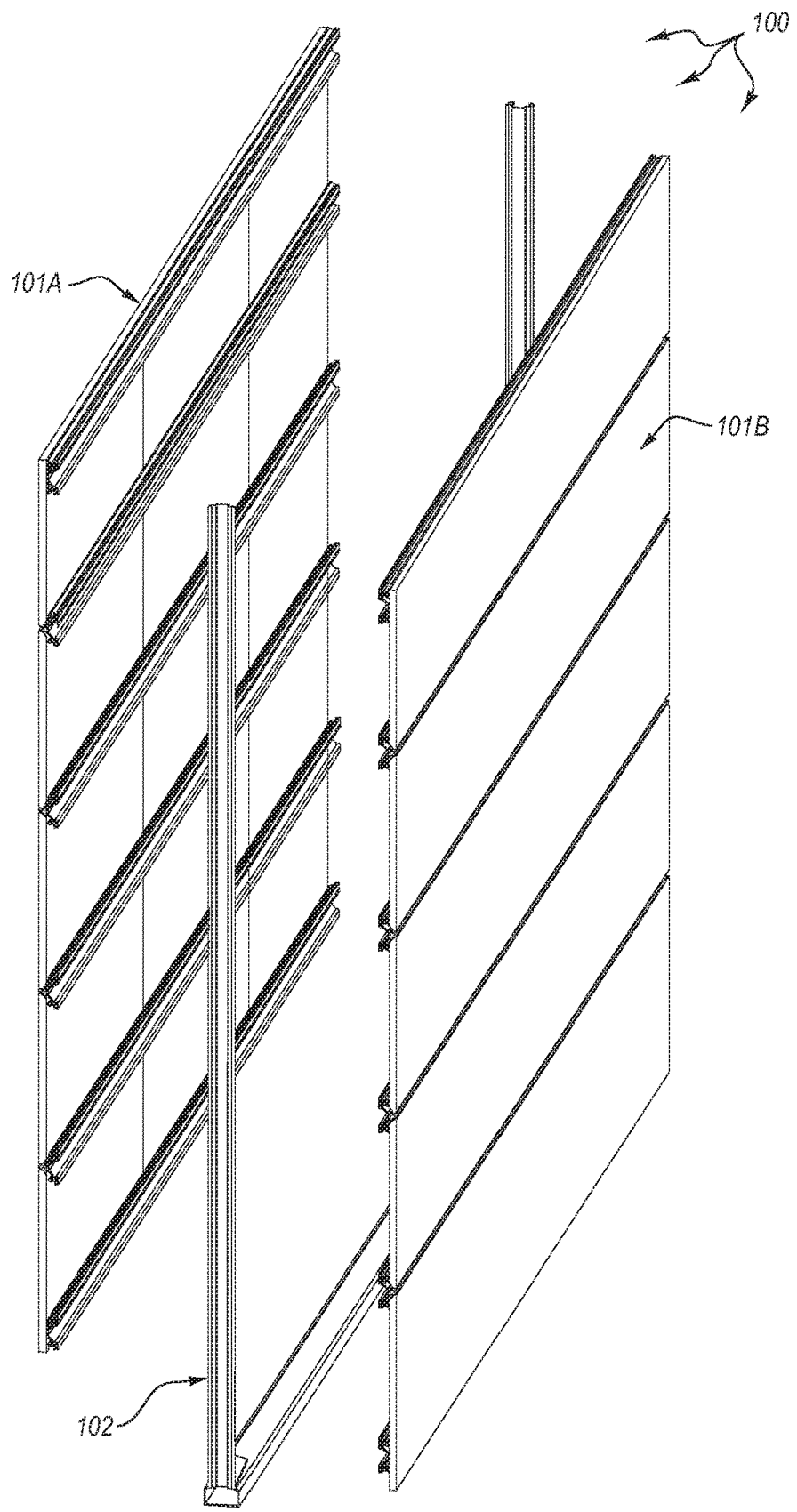
FIG. 1 illustrates an exploded perspective view of a modular wall panel.

Certain embodiments may be disposed between outer tiles 101A and 101B of a modular wall panel shown in FIG. 1. The outer tiles 101A/101B are secured to an outer frame 102 and conductive plates 203, shown in FIG. 2. These conductive plates may be disposed between the tiles 101A/101B on the interior of the panel, such that the conductive plates 203 are positioned within the completed modular wall 100 (or "modular wall system 100" herein). At least in some embodiments, the conductive plates 203 are disposed generally parallel to the tiles 101A/101B within the modular wall panel 100.

The tiles 101A and 101B may be made of wood, plastic, metal, fabric, glass, or other materials. It may be desirable to dispose a decorative feature or decorative panel behind a transparent tile for aesthetic design purposes. Decorative features or layers are visible if placed behind a glass or otherwise transparent tile. A decorative feature may not be visible if an opaque layer of material is disposed between the decorative feature and the transparent tile. This will be described further below with reference to FIG. 8.

Figure 2:
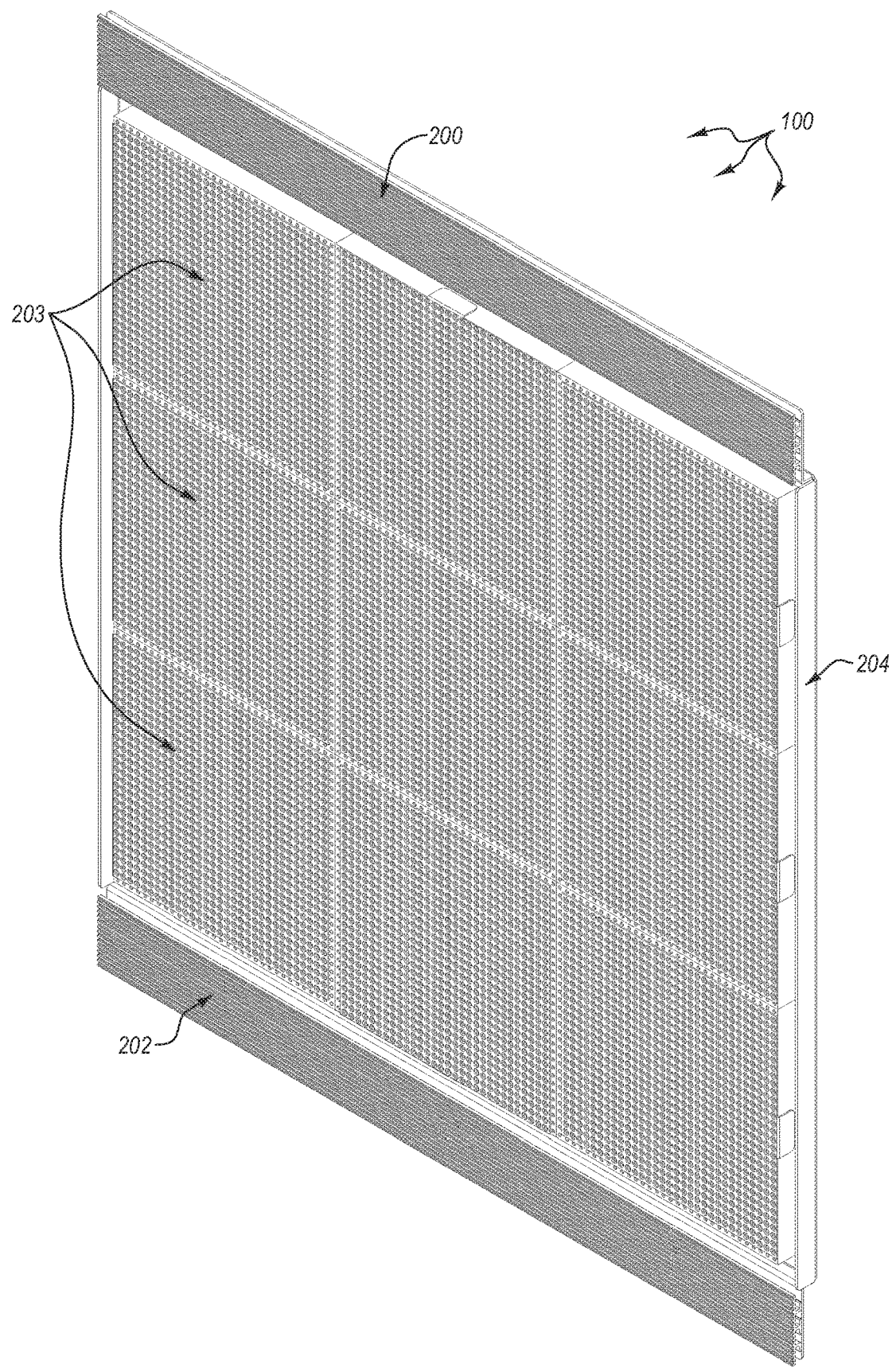
FIG. 2 illustrates a front perspective view of a set of conductive plates.

In the embodiment shown in FIG. 2, multiple conductive plates 203 are held in place by a backer frame 204. The modular wall 100 shown in FIG. 2 illustrates nine separate conductive plates 203 that are coplanar with one another. While FIG. 2 depicts multiple separate conductive plates 203 attached to a single backer frame 204, in at least one embodiment there is only a single conductive plate disposed between the modular wall tiles 101A/101B. In other embodiments, a plurality of conductive plates may be held in place by the backer frame. It will also be understood that different shapes and sizes of conductive plates may be used, even within the same frame.

The conductive plates 203 are configured to make contact with the inside of a modular wall tile 101A (see FIG. 1). The conductive plates 203 make contact with all or a significant portion of the inside surface area of a tile 101A. In some embodiments, conductive plates may make contact with a small portion of the surface area of the inside of a tile 101A. Other embodiments may have multiple conductive plates 203, each making contact with a small portion of the inside surface area of a tile 203. Further embodiments may include a single conductive plate making contact with either a large or small portion of the inside surface area of a tile 101A. One will appreciate in light of the disclosure that the conductive plates can have almost limitless configurations as to position and contact locations with the modular wall tiles 101A/101B.

When conductive plate or plates 203 have been fastened to the backer frame, and are in contact with the inside surface of one or more modular wall tiles 101A/101B, an electrical potential is provided to the conductive plates 203. When the electrical potential is provided, touchscreen capabilities are enabled using capacitance sensing methods. Such methods may include surface capacitance or projected capacitance sensing methods.

When a user (or object) makes contact with the modular wall tile 101A, for example using a hand, an electrical capacitance can be measured. In at least one embodiment, the position of the finger contacting the tile 203 is also determined. The measured electrical capacitance and hand position are used as a signal, relayed by the control unit 204, to initiate some other event or events. An event may include, for example, turning on a light, a speaker, or controlling an appliance. Any other event requiring an electrical signal to be initiated could be done so using this touchscreen technology.

An upper bar 201 and a lower bar 202 may be disposed above and below the conductive plates 203, respectively. The upper and lower bars 201, 202 may be secured to the conductive plates 203 and/or secured to the backer frame 204. The upper and lower bars 201, 202 can be wood, plastic, metal, glass, or other materials. The upper and lower bars 201, 202 may fill space between modular wall panels disposed next to each other (or above and below each other) or may serve to help secure the backer frame 204 or conductive plates 203 within the modular wall panel. In at least one embodiment, the upper bar 201 and/or lower bar 202 attach to a horizontal stringer extending between outer frame 102 ends. As such, in at least one embodiment, the upper bar 201 and/or lower bar 202 are attached to the frame of the modular wall system and hold the conductive panels 203 against the tiles 101A/101B.

Figure 3:
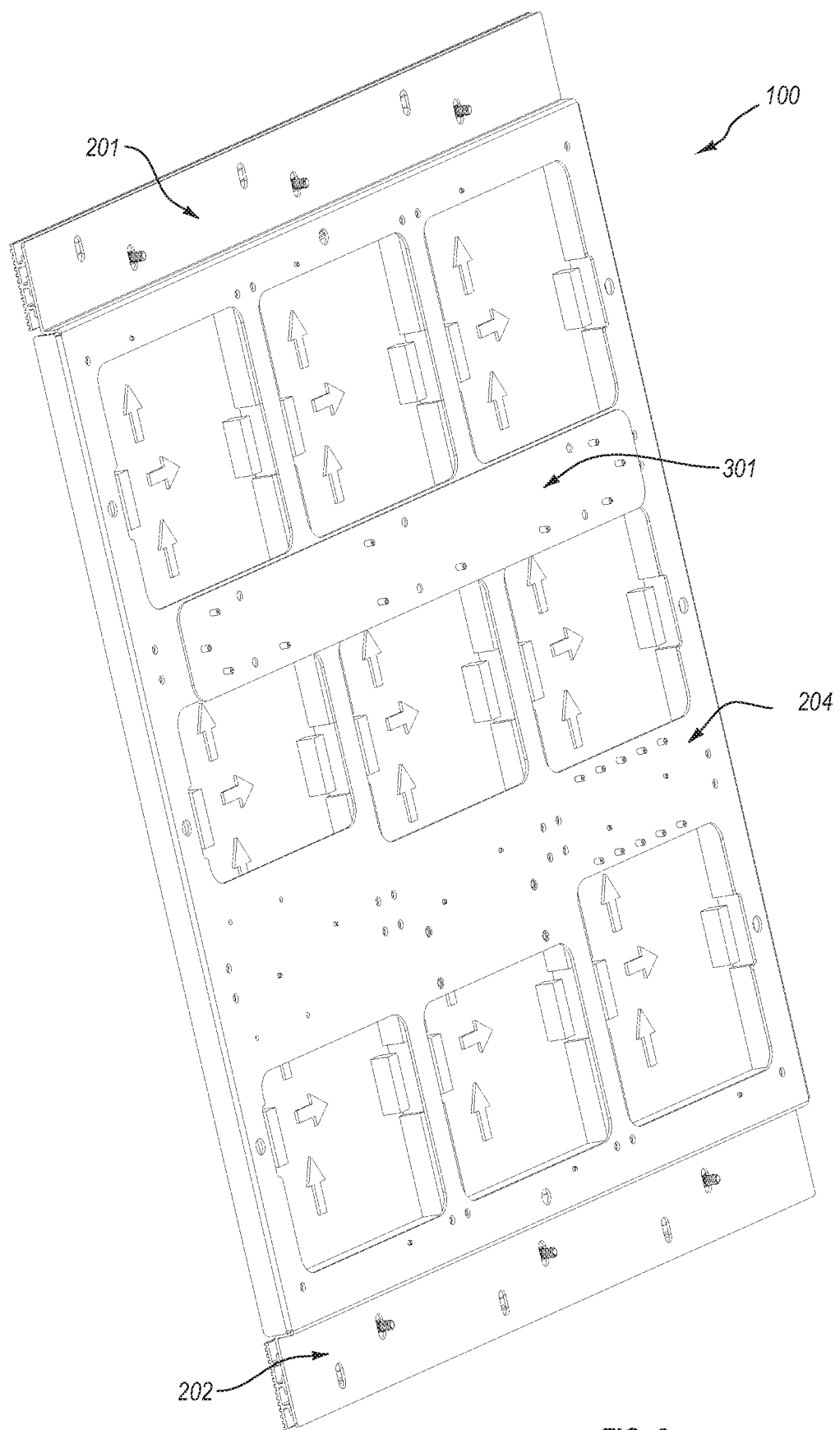
FIG. 3 illustrates a back perspective view of a set of conductive plates, including a control panel and backer frame.

FIG. 3 illustrates an embodiment of a modular wall 100 that includes a backer frame 204. The backer frame 204 is a rigid or semi-rigid frame that secures the conductive panels 203 in position. The backer frame 204 can be composed of any rigid or semi-rigid material. The backer frame 204 secures the conductive plates 203 in position using bolts, fasteners, clips, adhesives, or any other securement method that does not interfere with the conductive functionality of the conductive plates 203.

The backer frame 204 is configured to secure the conductive plates 203 on the interior of the modular wall panel 100. In embodiments, the backer frame 204 does so by securing to the outer frame 102 of the modular wall panel at one or more points around the outer edge of the backer frame 204. One will appreciate in light of the present disclosure that the backer frame 204 may be secured within a modular wall panel by any means appropriate in order to hold the conductive plates 203 in position and ensure the proper functioning of the conductive plates 203 and control unit 301.

Figure 5:
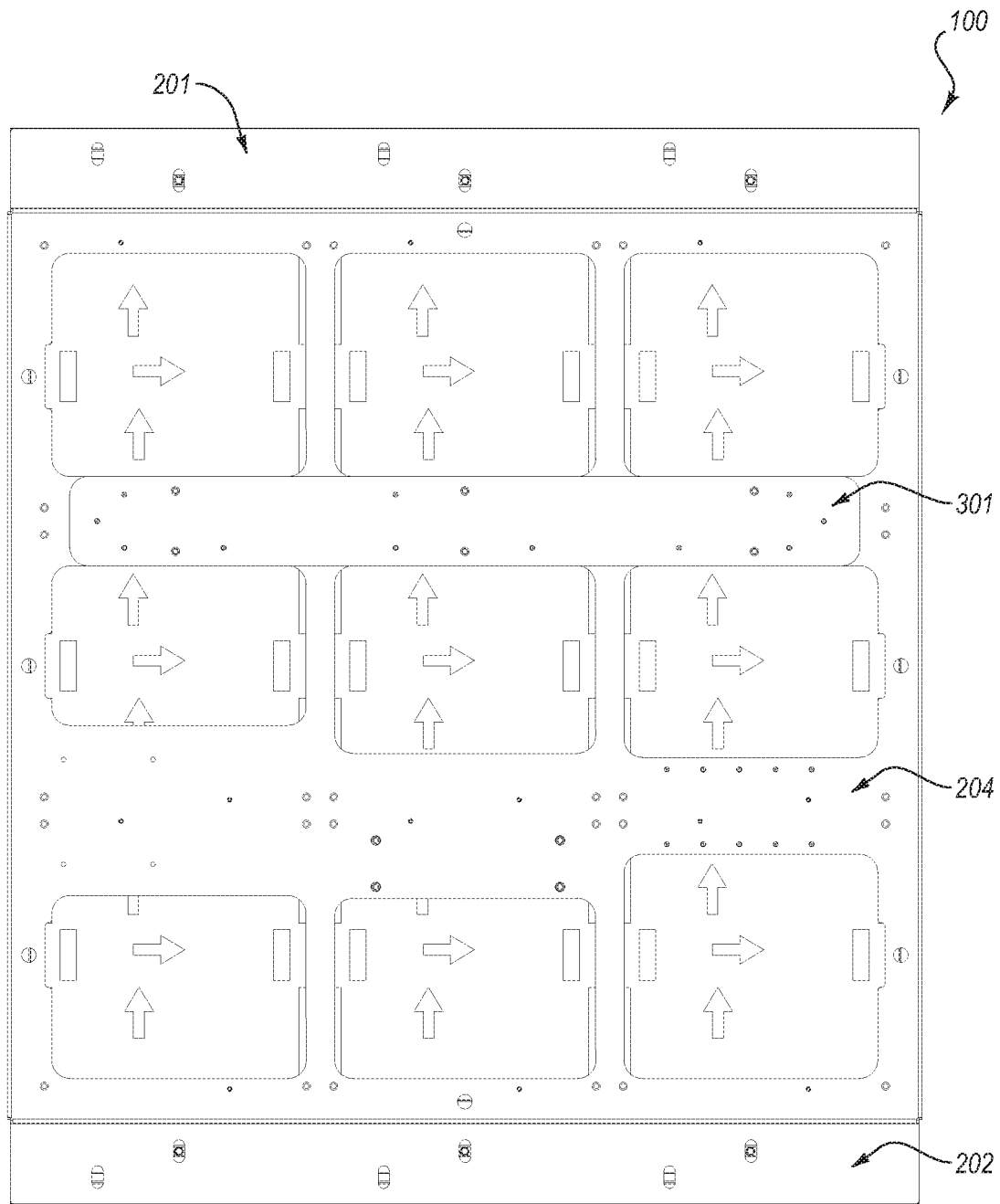
FIG. 5 illustrates a back view of FIG. 2.

Indeed, the embodiment shown in FIG. 3 includes a control unit 301. In at least one embodiment, as generally shown in FIGS. 3 and 5, the control unit 301 is positioned and secured to the backer frame 204. The position of the control unit 301 as shown in FIGS. 3 and 5 is not necessarily a preferred position; rather it is just an example position. The control unit 301 may be disposed in any location within the modular wall panel that does not interfere with the proper functionality of the conductive plates 203 or modular wall panel.

The control unit 301 may provide an electric potential to the conductive plates 203 and may receive signals or information from the conductive plates 203 as described above. The control unit may initiate some other event, such as turning on a light or a speaker. These events may occur inside or outside the modular wall panel. In at least one embodiment, integrating the control unit 301 into the backer frame 204 allows a modular wall system to retain its modularity. For example, an entire tile, and accompanying conductive plates 203 and backer frame 204, can be easily removed and repositioned at a different location within the modular wall system without requiring significant rewiring. Accordingly, each modular wall panel may have its own backer frame 204, control unit 301 and conductive panels 203.

Figure 4:
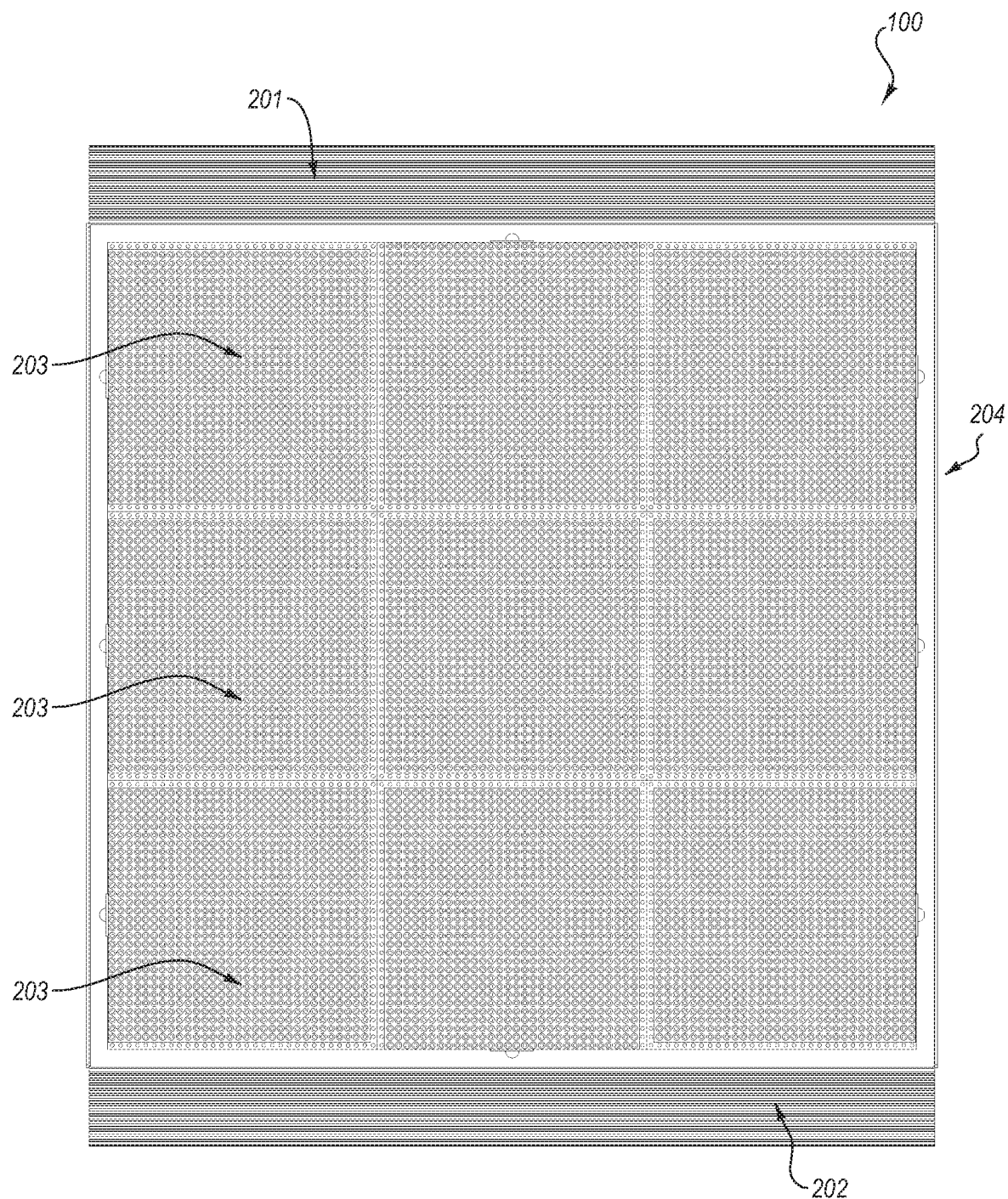
FIG. 4 illustrates a front view of FIG. 2.

FIG. 4 illustrates a front facing view of the modular wall panel 100. In this configuration, the modular wall panel includes nine conductive panels, each configured to determine, based on changes in capacitance, where a user or object has touched the conductive panel. This information is fed to the control unit, which makes the calculations and determinations. The control unit 301 also generates and transmits commands to other systems or networks. These transmissions may occur wirelessly (e.g. WiFi or Bluetooth) or over a wired connection (e.g. Ethernet). As shown in FIG. 5, differently sized conductive panels may be used and, in some embodiments, the panels may be arranged in different rotations.

Figure 6:
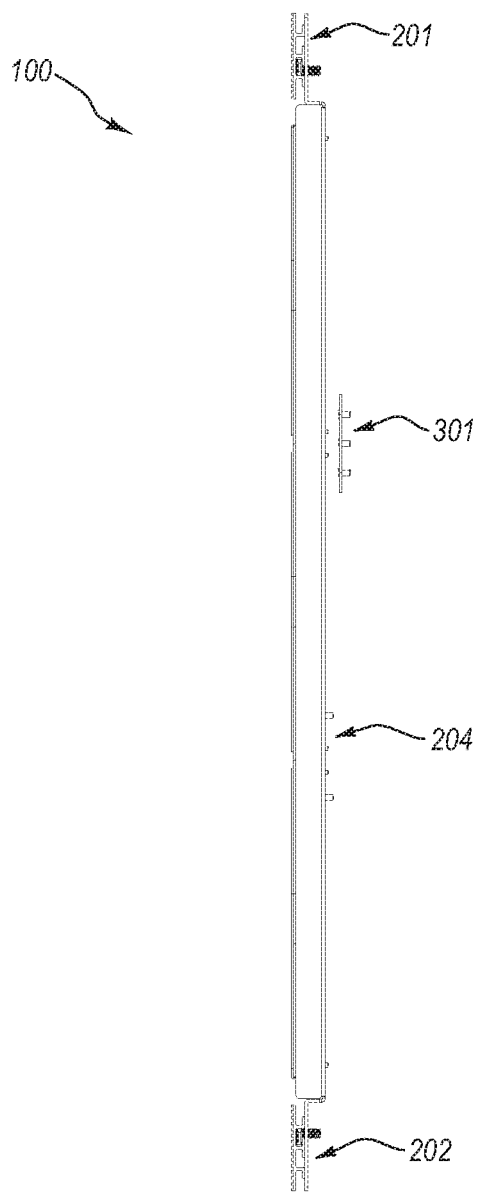
FIG. 6 illustrates a side view of FIG. 2.
Figure 7:
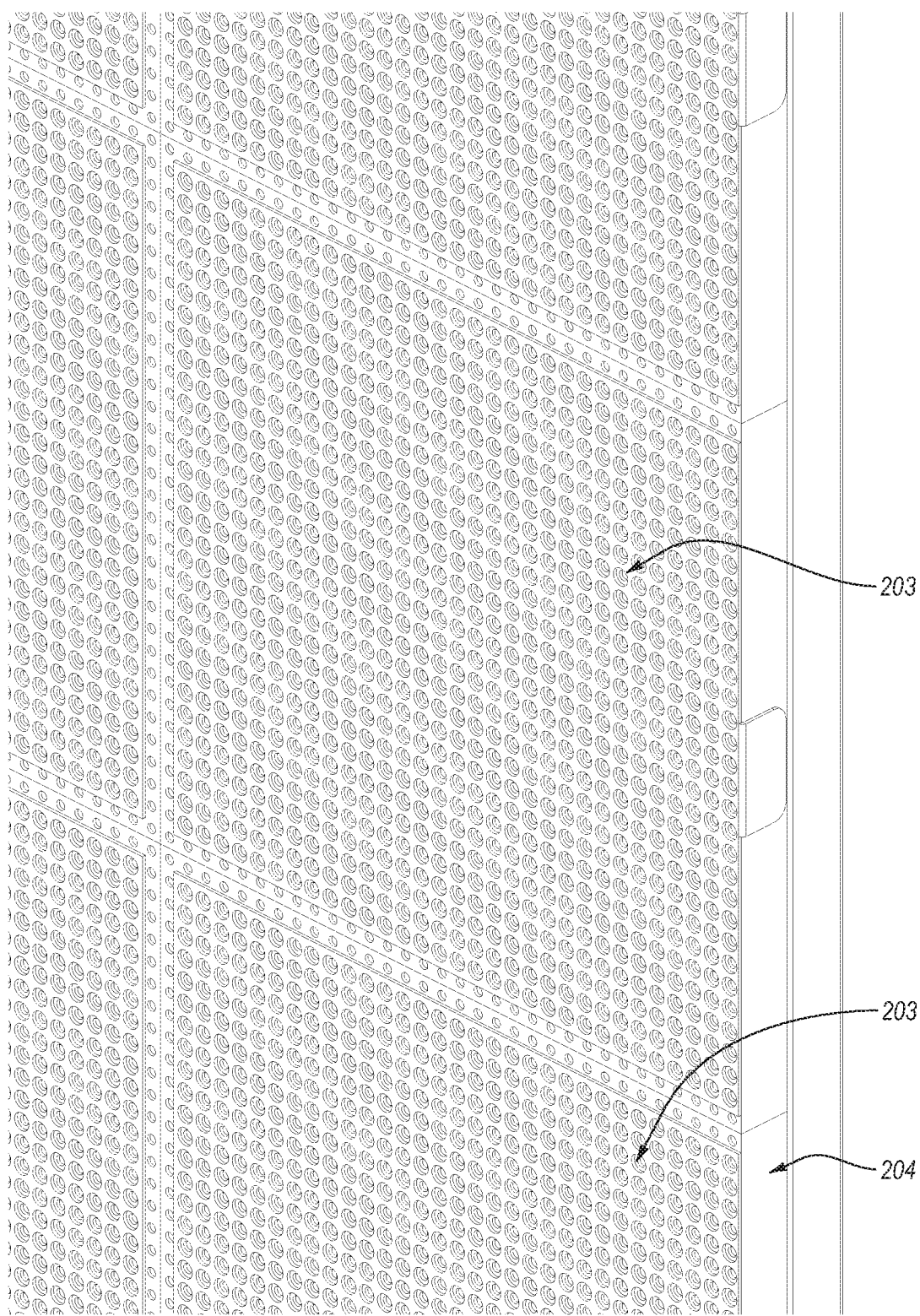
FIG. 7 illustrates a cross-sectional perspective view of FIG. 2.

FIG. 6 illustrates a side view of the modular wall panel 100, with upper and lower bars 201 and 202, along with the backer frame 204 and the control unit 301. FIG. 7 illustrates a close up view of the conductive panels. These conductive panels may be designed to operate at a very low voltage (e.g. <32 volts). This allows for usage in a variety of different locations, including locations where water may be present, such as in bathrooms or outdoors. At least in some embodiments, the outer tiles 101A/101B may protect the modular wall panel 100 from elements such as rain, snow and ice, or from humidity and steam in a bathroom. Thus, such a modular wall system with conductive panels may be used to operate lights, music, blinds, shower or bath controls, or other features available in a home automation system. As will be explained further below with regard to FIG. 9, some of these controls may be hidden in the modular wall system such that they are not visible to outside users, and are only known to the owner.

Figure 8:
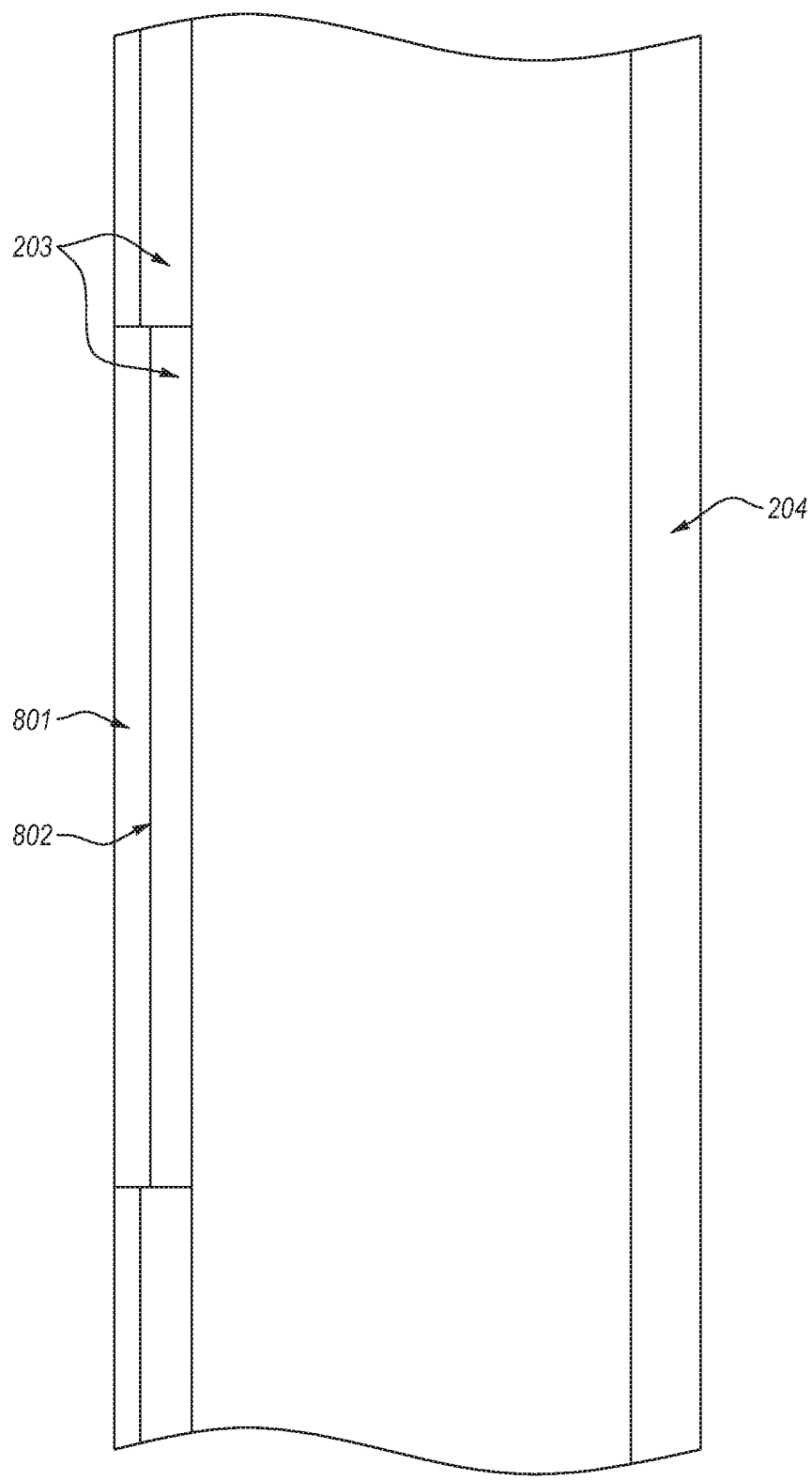
FIG. 8 illustrates a cross-sectional view of a decorative panel, conductive plate, and backer frame.

FIG. 8 describes an embodiment which includes a decorative feature 802, such as an ink layer, that may be applied to the back of a glass modular wall panel tile 801. This decorative feature 802 (or "decorative panel") is disposed between the glass tile 801 and one or more conductive plates 203. A section of a backer frame 204 is also shown. The decorative feature 802 is visible through the glass tile 801. The conductive plate 203 serves as a means to detect a capacitance from contact with the outside of the glass tile 801 even with a decorative feature 802 disposed between the conductive plate 203 and the glass tile 801.

Although it will be recognized that touchscreens have been incorporated into permanent walls, such solutions are inappropriate for modular walls that include individual panels which can be rearranged and moved. Modular wall panels that feature decorative glass may be especially problematic for such fixed solutions because the conductive layer that enables capacitive touch capabilities can interfere with the decorative layer. The enhanced conductive capabilities of the conductive plates 203 (e.g. steel plates), allow for changes in capacitance to be detected even with a decorative feature present. These changes in capacitance may be detected even if the decorative feature is disposed between the outer tile 101A and the conductive plates 203.

In one specific embodiment, a modular wall system 100 is described. This modular wall system includes a modular frame 102, one or more tiles attached to the modular frame, and at least one decorative panel 802 positioned between at least one of the tiles and one or more interconnected conductive plates 203. The conductive plates are configured to hold an electrical potential and detect an electrical capacitance through the decorative panel at an identified position on the conductive plate when touched. In some cases, the conductive plates may be steel plates.

Figure 9:
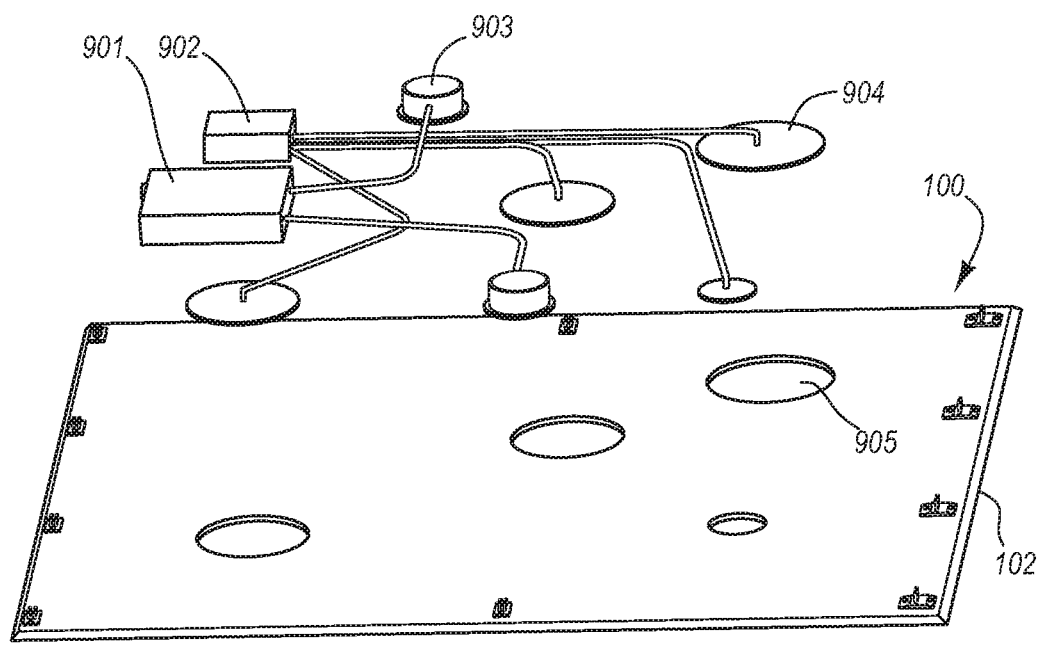
FIG. 9 illustrates a top perspective view of a control unit with inductive plates that are positioned over various holes that accommodate the inductive plates.

As shown in FIG. 9, the inductive plates 904 may be electrically connected to and controlled by a control unit 901. The control unit is 901 configured to control the amount of power supplied to the conductive plates from the power supply 902. The control unit 901 also receives signals from the inductive plates 904 and performs actions based on receiving the signals. For example, the control unit 901 may receive an input indicating that a person or other item has touched one or more of the inductive plates 904, or has otherwise interacted with a sensor 903. In response to determining that an inductive plate has been touched, a specified process flow may be triggered. In some cases, the process flow may involve performing a software routine using a processor and memory. In other cases, the process flow may turn an electrical appliance on or off, or may change an operational mode (e.g. vary the speed level of a ceiling fan), or may change operational features of a system.

For example, if the modular wall panel 100 were used in a bathroom setting where the decorative panel 802 was a glass panel positioned between at least one of the tiles 101A/101B and the interconnected conductive plates 203, a user may be able to interact with the conductive plates or the inductive plates 904 to control shower settings (e.g. water temperature), radio settings (to change music playing over loudspeakers), television settings, etc. In some cases, the locations of the inductive plates are hidden (e.g. in holes 905) and, as such, only the owner may know of their location. Indeed, a decorative panel 802 may include an ink layer that is positioned between the outer tile 101A and the conductive plates. The ink layer may be opaque, and may thus hide the inductive or conductive plates, along with the controller 901 and the power supply 902. It will be understood that other electronic components may be hidden in this manner, and that they may be positioned substantially anywhere in the modular wall panel. Moreover, because each modular wall panel has its own components, the panels may easily be removed or interchanged for different panels.

The conductive plates 203 may be attached to the modular frame of the modular wall system using an upper bar 201 and a lower bar 202, as shown in FIGS. 2 and 4. The upper and lower bars hold the conductive plates 203 against the tiles 101A and 101B. The conductive plates may be removable from the modular wall system 100. This provides flexibility to change the ordering, orientation, or height of the conductive plates. Moreover, the conductive plates may be repositionable from their original position. They may be connected to the controller 901 and/or the power supply 902 via wired and/or wireless connections that allow the plates to be moved to different positions within the modular wall panel. In some cases, an entire tile and accompanying conductive plates and modular frame are removed and repositioned at a different location within the modular wall system. This can be done without requiring significant rewiring, and thus reduces cost.

Figure 10:
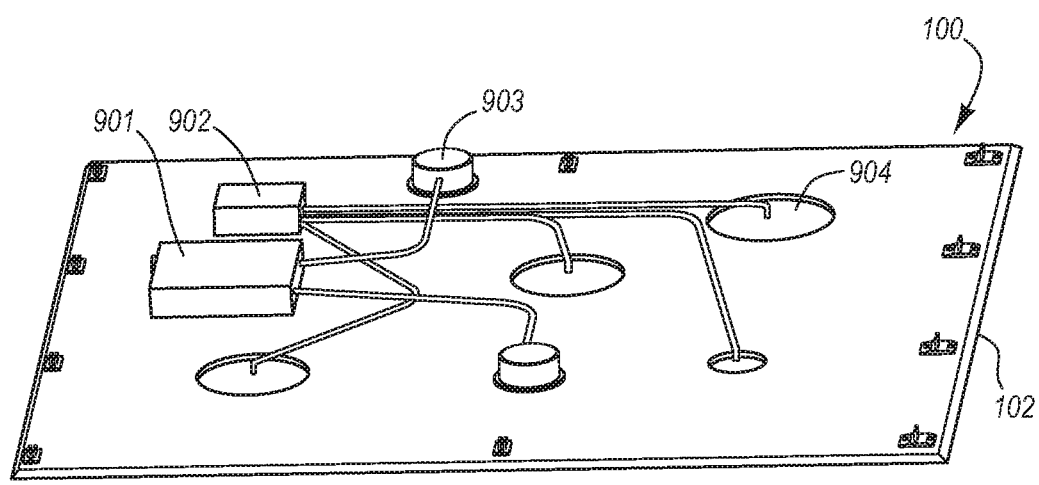
FIG. 10 illustrates a top perspective view of a control unit with inductive plates that is attached to a backer frame.
Figure 11:
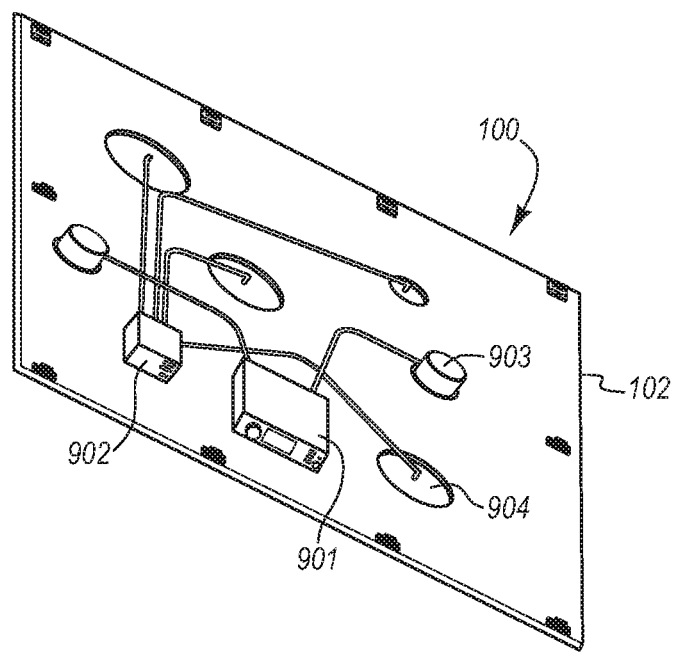
FIG. 11 illustrates a perspective view of FIG. 10.
Figure 12:
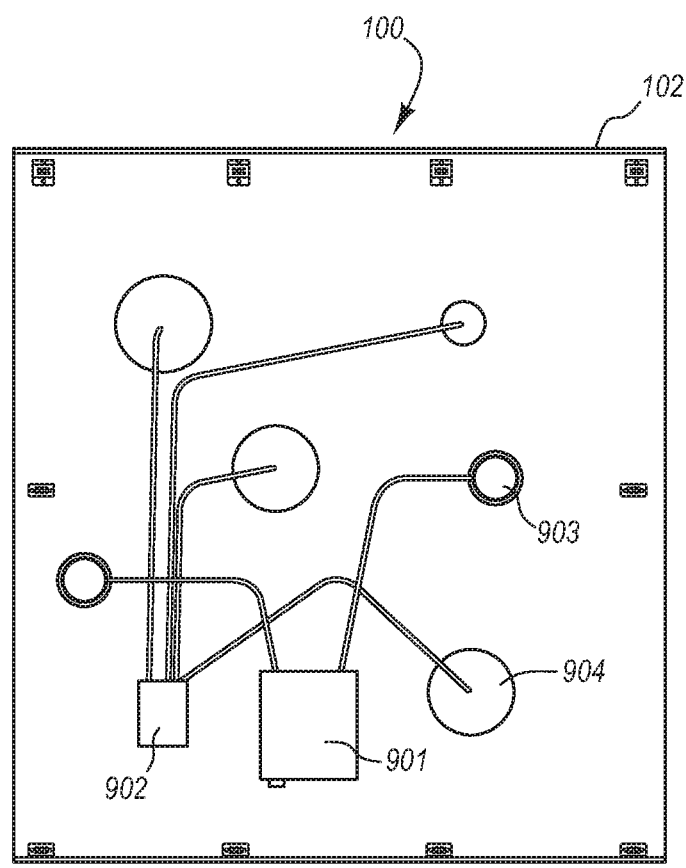
FIG. 12 illustrates a top view of FIG. 10.

FIG. 10 illustrates the same modular wall system 100 as in FIG. 9, but in FIG. 10, the control unit 901, power supply 902, and the inductive plates 904 are affixed to the backer frame 204, whereas in FIG. 9 they are shown as being separate from the backer frame. The components 901-904 may be affixed using a variety of different materials which are permanent or semi-permanent, allowing for removal if needed. The inductive plates 904 may be placed where holes 905 have been cut in the conductive plates 203. Alternatively, the conductive plates 203 may be shaped and sized or positioned to allow for spaces between the conductive plates. Within these spaces or holes, the (hidden) inductive plates 904 may be placed. FIGS. 11 and 12 show perspective and top views of the embodiment shown in FIG. 10.

FIG. 10, for example, shows a modular wall system 100 that has an outer frame 102. The wall system has tiles (101A/101B) of FIG. 1 attached to the frame, as well as conductive plates (203 of FIG. 2). The conductive plates are configured to hold an electrical potential and detect an electrical capacitance at an identified position on the conductive plate when touched. Some of the conductive plates 203 may have a pocket or hole 905 formed therein. An inductive plate 904 may be disposed in or over the pocket of the conductive plate. The inductive plate 904 provides a hidden switching location that, when activated, triggers transmission of a signal to a specified destination. This signal may be an electrical signal that may include data instructions indicating a specific task or process flow that is to be initiated.

The control unit 901 may include a microcontroller or other processing system with a processor and/or memory that is configured to control various electronically actuatable devices. The signal may indicate, for example, that a light is to be turned on, or that a light's brightness is to be dimmed, or that a radio is to be turned on and tuned to a specific station. Substantially any electronic device or system that can be actuated remotely can be actuated and controlled using the inductive plates 904 and the control unit 901. The inductive plates may be connected to the microcontroller via a wired or wireless connection. In cases where the tiles 101A or 101B are glass tiles, the microcontroller may be laminated to the glass tile. This allows the modular system to be easily removed and transferred to another location, while maintaining proper electrical functionality.

The inductive plates 904 may be configured to operate in either a neutral state or an inductive state. This allows low-voltage operation of the inductive plate. Low voltages of 32V or lower can be used to switch an inductive plate from a neutral state to an inductive state, thereby triggering a signal. Such low voltages permit the modular wall panels to be used in bathrooms, washrooms or other settings that involve water. In this manner, modular wall systems can be used in many places and situations that were not possible or safe previously. Moreover, embodiments can include hidden switching locations disposed in certain places behind the outer tiles 101A/101B. These can each be used to perform different functions known to the user.

The conductive plates may be disposed in such a way that the conductive plates surround the inductive plates. Alternatively, the inductive plates may be positioned on the outer edge of the wall panel, so that they surround the conductive plates. Many different combinations of shapes, sizes, positions and orientations are possible. For example, in some cases, multiple conductive plates are disposed in a row within the modular frame. Some of these conductive plates in the row of plates are of different sizes or shapes. Some may have holes or pockets. The inductive plates may be positioned in the holes or pockets, or in the areas left open between the conductive plates of different size or orientation. Indeed, the conductive plates 203 within any given row or column of plates may be oriented differently, depending on the design of the wall.

Designers may be able to control or change many different aspects of the modular walls described herein including the positioning of holes or pockets in the conductive plates, the positioning, size, shape and number of inductive plates, the functionality triggered by each inductive plate, the inclusion of a decorative panel positioned between the outer tiles and the conductive plates, as well as other features. Users or designers may be able to change and customize the functionality of each inductive plate by accessing the control unit 901 via a user interface. Through such a user interface, the user or designer may select which functionality is to occur on the electrically-linked actuatable devices as a result of actuating the inductive plate. The actuation of the inductive plate transmits a signal which initializes execution of a computer command. That command can be controlled or modified using the user interface.

Thus, a modular wall system is provided which includes conductive and inductive plates, and allows users to control functionality triggered by the use of the conductive or inductive plates, including in low-voltage scenarios. The embodiments herein may be described in other specific forms without departing from their spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A modular wall system, comprising:
   a modular frame;
   one or more tiles attached to the modular frame, the one or more tiles comprising an inside surface, and an outside surface positioned to be touched by an end-user;
   at least one decorative panel positioned between the inside surface of at least one of the tiles and one or more interconnected conductive plates; and
   the one or more conductive plates, wherein the conductive plates are configured to hold an electrical potential, and to detect an electrical capacitance through the decorative panel at an identified position on the conductive plate when the outside surface of an adjacent one of the one or more tiles is touched.

2. The modular wall system of claim 1, wherein at least one of the conductive plates comprises a steel plate.

3. The modular wall system of claim 1, further comprising a control unit, wherein the control unit is configured to provide power to the conductive plates and receive signals from the conductive plates.

4. The modular wall system of claim 1, wherein the decorative panel positioned between at least one of the tiles and one or more interconnected conductive plates includes an ink layer, and is opaque, thereby concealing the adjacent conductive plate.

5. The modular wall system of claim 1, further comprising an upper bar and a lower bar that are attached to the modular frame of the modular wall system and hold the conductive plates against the tiles.

6. The modular wall system of claim 1, wherein the conductive plates are removable from the modular wall system, providing flexibility to change an ordering, an orientation, or a height of the conductive plates.

7. The modular wall system of claim 1, wherein an entire tile and accompanying conductive plates and modular frame are removed and repositioned at a different location within the modular wall system.

8. A modular wall system, comprising:
   a modular frame;
   one or more tiles attached to the modular frame;
   one or more conductive plates, wherein the conductive plates are configured to hold an electrical potential and detect an electrical capacitance at an identified position on the conductive plate when touched, and wherein at least one of the conductive plates has a pocket formed therein; and
   an inductive plate disposed in the pocket of the at least one conductive plate, the inductive plate providing a hidden switching location that, when activated, triggers transmission of a signal to a specified destination.

9. The modular wall system of claim 8, further comprising a microcontroller configured to control one or more electronically actuatable devices.

10. The modular wall system of claim 9, wherein the inductive plate is connected to the microcontroller via a wired connection.

11. The modular wall system of claim 9, wherein at least one of the tiles comprises a glass tile, and wherein the microcontroller is laminated to the glass tile.

12. The modular wall system of claim 8, wherein the inductive plate operates in a neutral state and an inductive state, allowing low-voltage operation of the inductive plate.

13. The modular wall system of claim 8, further comprising at least one decorative panel positioned between at least one of the one or more tiles and one or more of the conductive plates.

14. The modular wall system of claim 8, wherein the transmitted signal initializes execution of a computer command.

15. The modular wall system of claim 8, wherein the modular wall system includes a plurality of hidden switching locations disposed in a specified pattern behind a plurality of the tiles.

16. A modular wall system, comprising:
   a modular frame;
   one or more tiles attached to the modular frame;
   one or more conductive plates, wherein the conductive plates are configured to hold an electrical potential and detect an electrical capacitance at an identified position on the conductive plate when touched, and wherein at least one of the conductive plates has a pocket formed therein;
   an inductive plate disposed in the pocket of the at least one conductive plate, the inductive plate providing a hidden switching location that, when activated, triggers transmission of a signal to a specified destination; and
   a microcontroller configured to control one or more electronically actuatable devices that are communicatively connected to the microcontroller via a wired or wireless connection.

17. The modular wall system of claim 16, wherein a plurality of the conductive plates are disposed in a row within the modular frame.

18. The modular wall system of claim 17, wherein at least two of the conductive plates in the row of plates are of different sizes.

19. The modular wall system of claim 17, wherein at least two of the conductive plates in the row of plates are oriented differently.

20. The modular wall system of claim 16, wherein the conductive plates are disposed such that the conductive plates surround the inductive plate.

* * * * *